United States Patent [19]

Felton

[11] 4,440,427

[45] Apr. 3, 1984

[54] RESOURCE EFFICIENT WATER POWER PRIME MOVER

[76] Inventor: Willard B. Felton, 527 W. Orman Ave., Pueblo, Colo. 81003

[21] Appl. No.: 381,416

[22] Filed: May 24, 1982

[51] Int. Cl.³ .............................................. F05B 7/00
[52] U.S. Cl. ....................................... 290/54; 415/5; 60/639
[58] Field of Search ................... 60/639, 640; 290/43, 290/54; 415/5; 416/728

[56] References Cited

U.S. PATENT DOCUMENTS

| 379,533 | 3/1888 | Allin | 60/639 |
| 398,268 | 2/1889 | Lohman | 415/5 |
| 407,213 | 7/1889 | Johnson | 60/639 |
| 467,840 | 1/1892 | Walker | 60/639 |
| 1,567,971 | 12/1925 | Martin et al. | 415/5 |
| 4,151,719 | 5/1979 | Boots | 60/639 |
| 4,184,584 | 1/1980 | Dehlen | 416/7 |

FOREIGN PATENT DOCUMENTS 53-27074  6/1978  Japan ...................................... 60/639

*Primary Examiner*—J. V. Truhe
*Assistant Examiner*—Shelley Wade

[57] ABSTRACT

The invention details a water wheel employing free-swinging buckets pivotally supported at the radial extremity of twelve spokes of the wheel. The buckets become captive in the load position at the top of the wheel, providing for controlled filling characteristics and at the bottom of the wheel providing for controlled discharge of the water. The orifice between the overlying water basin and the buckets is subject to two control functions; it is closed when no bucket is present for loading the water head to which it is subjected is variable for speed and power control. The closure of the orifice is accomplished by water seals and is claimed as a unique feature of this invention. The power output is delivered through the main shaft supporting the wheel and buckets through the optional use of conventional methods of coupling. The dumping of the spent water load at the bottom of the wheel employs a rack and pinion device to provide for the total discharge of the water from the drum-shaped buckets. The unloaded drum returns a part of the energy required for dumping to the system as it returns to original center of gravity attitude.

6 Claims, 5 Drawing Figures

RESOURCE EFFICIENT WATER POWER PRIME MOVER

The intent of this invention is to harness the kinetic energy in the flow from a head of water in a more efficient manner than provided by conventional water wheels and motors. The areas of efficiency addressed are the loading of the buckets, power transmittal and discharge of water accomplished in the use of gravitational force as a source of energy.

Water wheel and motor devices are quite common in the field of water energy devices. Motors, in particular, have been designed to utilize the total vertical travel of the water in power transmittal. Such devices are noted for their use of chains and sprockets with basically rectangular paths of travel. As an example, patent application by Boots Ser. No. 747,924 details such an apparatus with water filled buckets traveling horizontally at the top of the structure in an attempt to provide full energy delivery through the total height being used in the power delivery cycle. This concept ignores the energy loss in the lateral transporting of the dead weight of water filled buckets from the point of loading to the descent mode.

Economy of water usage has been addressed in other machines by close spacing of the buckets. A substantial amount of water is lost, however, by virtue of the water head against the areas of nonconfined flow.

Further, the horizontal travel of the water laden bucket at the bottom of the power cycle, prior to dumping, adds to the loss of energy. A trip mechanism, as detailed by Boots, requires the lifting of the bucket, in rotary fashion, to discharge the water. In this system, two functions are counterproductive to the energy salvage function; a forward pour causes the bucket to move into the water being dumped; the completed dump cycle allows the bucket to be released in a free-swinging manner, resulting in the energy used to lift the dead weight of the bucket to the dump position being dissipated in free-swinging oscillations.

Recognizing the above problems as areas where greater efficiency can be effected, an important aspect of this invention is the sealed loading condition at the top of the wheel. The circumference of the upper extremity of the wheel is in constant contact with the overlying water basin through the use of water seals.

Another important object is that torque is produced continually from the point of bucket loading to the point of discharge initiation, with no idle transport of water.

Important to the total design is the unique discharge of the load water by a rack and pinion mechanism whereby the bucket moves away from the discharging water. Further, as the bucket completes three-hundred-sixty degrees of rotation, it returns to the system the energy required to lift the bucket itself to the discharge position.

An integral element in the concept of the invention is the start, stop, and speed of rotation control. A manually operated valve in the base of the overlying water basin allows for the change from steady state to dynamic condition of the mechanism. Speed and stop functions are provided by varying the water head via an hydraulic automatic system or a manually operated control whereby the level of water in the basin is raised or lowered.

Drawing representations include the following:

Figure 1:
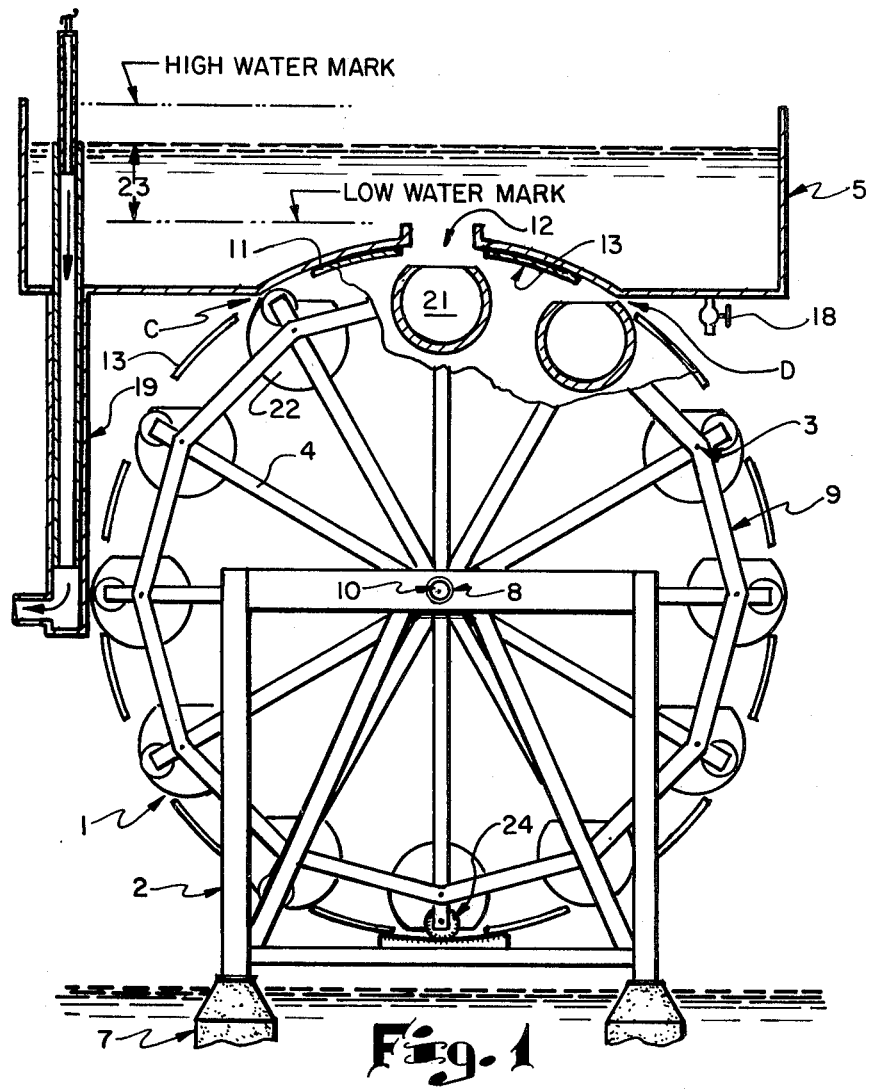
FIG. 1 is a side view of the water wheel incorporating those aspects presented as claims in this invention.

FIG. 1 displays a water wheel (1) consisting of a supporting frame (2) load buckets (3) at the radial extremity of the spokes (4) of the wheel, positioned beneath an overlying water basin (5) and above a water discharge area.

The frame (2) is comprised of two structurally stable steel rectangular frames mounted on suitable footings (7), provided with bearings (8) on each side of a vertically mounted wheel (9). The wheel shaft (10) enhances the spacing at the bottom.

The wheel (9) and frame (2) are critically located with respect to the overlying water basin (5) to enable a nearly water tight coupling (11) to be accomplished between the bucket load function of the wheel at the load orifice (12). During the bucket exchange mode, the orifice (12) is closed as a closure plate (13) operating as a valve moves across the orifice in lieu of the bucket (3).

Figure 3:
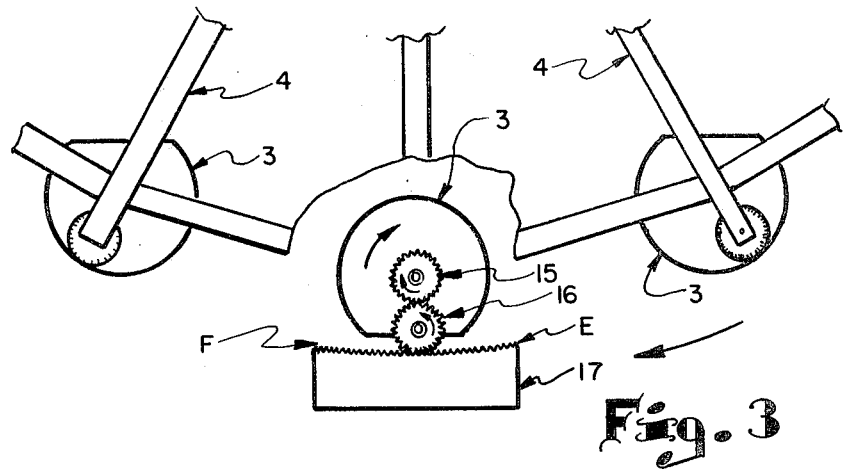
FIG. 3 is an enlarged detail of FIG. 1.
Figure 4:
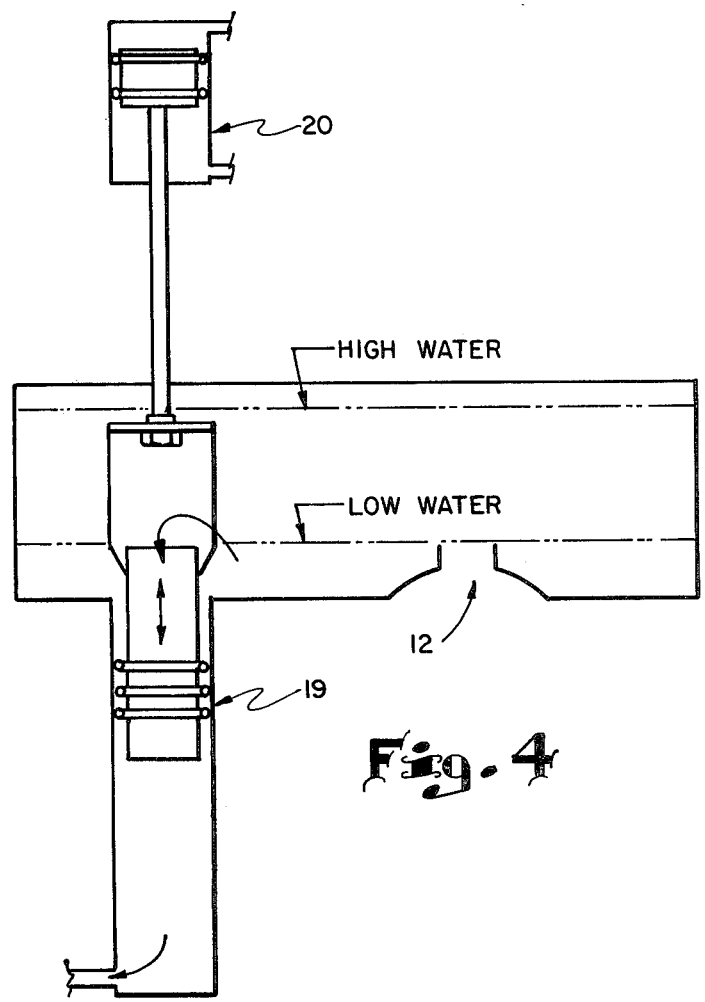
FIG. 4 is a detail representation of the longitudinal view of the overlying water basin control elements.

Each bucket (3) is comprised of a cylindrical element with an elongated opening at the top with ends that are substantially greater than semicircular. The walls are essentially the continuation of a drum shape to provide a greater load capacity than is capable with the conventional half-cylinder troughs used in the trip-discharge mechanism. The buckets are pivotally mounted (14) above the center of gravity and are controlled during the unload cycle by the control (15) and idler (16) pinions as they engage the stationary, frame-mounted rack (17) at point E (FIG. 3) and continue along the rack to finally disengage at point F (FIG. 3).

The overlying water basin (5) consists of a reservoir for the storage and dispersement of water located directly above the water wheel (1) and in physical contact with the wheel from point C to D. The basin width is equal to the bucket (3) width and provides water into each bucket as it passes the orifice (12) in its base. The height of water in the basin (5) is controlled by the automatic or manual adjustment of the discharge control pipe (19). The control may be accomplished by a governor-controlled hydraulic piston (20) or by the manual adjustment of a hand wheel, depending upon the operational requirement. The basin employs a manually operated discharge valve (18) in the process of setting the mechanism in motion. Water released through the valve fills a bucket below and moves the wheel out of the static equilibrium. The basin (5) is integrally associated with the wheel (9) and support frame (2) providing for a constant space relationship between the wheel and basin from point C to point D (FIG. 1) thus allowing for a water seal (11) to effectively control the unwanted discharge and loss of water during the bucket exchange period.

Mechanical power output from the wheel is derived from a coupling (not shown) to the shaft (10) of the wheel (9). A system of gears, sprocket, and chain or crank are but a few acceptable methods. The manner of power delivery from this device is not a claim of this invention.

A description of the operation is as follows: water is introduced from the overlying basin (5) into an unfilled bucket (3) by manually opening the starting valve (18). Clockwise rotation, as viewed in FIG. 1, is initiated as a result of the moment arm torque to the rotation of the wheel causing an increase beyond that initially provided by the filling of the empty bucket (3) by the start valve (18). The manual start vlave (18) can then be closed as the system has been moved out of dynamic equilibrium. The travel of the filled bucket (21) on its descent contributes power to the system essentially from the top of its descent path. As it moves in a clockwise direction from the load orifice (21), it is followed by a closure plate that serves as a valve to terminate the discharge of water from the basin (5) until the next bucket (22) has moved into a loading attitude. Closure plates (13) precede and follow each bucket (3) on the wheel and are placed in close proximity to the leading edge of one bucket and the trailing edge of the preceding bucket for minimun water loss. Additionally, the closure plates (13) are in contact with the bottom of the basin (5) for the width of the bucket from point C to the orifice (12) introduction and from orifice (12) departure to point D, FIG. 1 The rate of bucket loading is a function of the water head (23) which is determined by the height of the control pipe (19); this is the control element for the angular velocity of the wheel (9).

Figure 2:
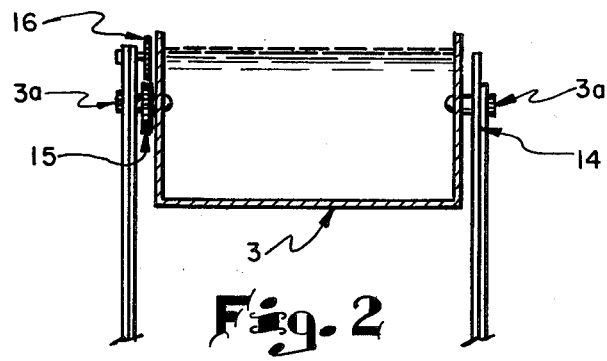
FIG. 2 is an enlarged detail of FIG. 1.

As the loaded bucket approaches the lower extremity of its vertical travel and power delivery cycle, an idler gear (16), FIG. 2, rotating on a shaft attached to the structural support spoke (24) of the wheel (9) engages the rack (17) from point E to point F in its rotational travel. The idler gear (16) drives the bucket control gear (15) attached to the bucket and rotating a concentrically with the bucket around the bucket support pivots (14). As the bucket moves to a point directly below the hub of the wheel, a point of neutral torque, it rotates on its axis in a clockwise manner. This action allows for the discharge of the water behind the bucket as it moves away from the mass of discharging water and rotates for one-hundred-eighty for total discharge. In this position, energy has been expended to raise the center of gravity of the bucket its axis of rotation. As the bucket moves from the neutral power position on to point F on the rack, this energy is returned to the system by reason that the point returning from the captive position to its normal attitude with the reverse power delivery accomplished through the control gear (15), idler gear (16), and rack (17). The three-hundred-sixty degree rotational aspect of the bucket allows for a drum type bucket to be used with the resulting greater load capacity than is possible with half-drum design of buckets.

The preceding analysis of the proposed water wheel exhibits unique modifications to conventional water wheel design that results in increased efficiency.

What is claimed as new and desired to be secured by Letters Patent is as follows:

1. In a water wheel type of power apparatus:
   an arrangement of buckets suspended on pinion controlled pivots with the open portion facing upward in the normal pendent position;
   each bucket located at the extremity of a spoke of the wheel with an idler pinion to engage a stationary rack at the bottom of the wheel;
   a driven pinion attached to the bucket that is controlled by the rack and pinion at the bottom of the wheel;
   an overlying water basin with a portion of its bottom contoured to engage in a water-tight mode the water wheel at the top;
   an orifice in the water basin that allows the discharge of water only during the time a bucket is in place to be filled ;
   a water seal that prevents the flow of water during the time that no bucket is present for filling;
   a rack at the bottom of the wheel to engage the idler pinion and control the bucket through three-hundred-sixty degrees of rotation during the discharge cycle;
   a frame supporting the wheel over a discharge basin for spent water control;
   a coupling from the drive shaft of the water wheel to utilize the generated power.

2. The invention of claim 1, said mechanism including a water-tight coupling between the overlying water basin and the water wheel.

3. The invention of claim 1, each pivot suspending its respective bucket in a pinion controlled mode below the open top and above the center of gravity of the bucket.

4. The invention of claim 2, said outlet extending parallel to the longitudinal axis of the bucket.

5. The invention of claim 2, said outlet having a width less than the full width of said bucket.

6. The invention of claim 1, and an adjustable discharge pipe to control the water head of the water basin.

* * * * *